United States Patent
Diessner et al.

(10) Patent No.: US 11,897,469 B2
(45) Date of Patent: Feb. 13, 2024

(54) SYSTEM AND METHOD FOR ADJUSTING TRAILER REVERSE ASSIST PARAMETERS BASED UPON ESTIMATED TRAILER POSITION

(71) Applicant: Continental Automotive Systems, Inc., Auburn Hills, MI (US)

(72) Inventors: Daniel Diessner, Rochester Hills, MI (US); Brandon Herzog, Waterford, MI (US)

(73) Assignee: Continental Autonomous Mobility US, LLC, Auburn Hills, MI (US)

(*) Notice: Subject to any disclaimer, the term of this patent is extended or adjusted under 35 U.S.C. 154(b) by 0 days.

(21) Appl. No.: 17/451,492

(22) Filed: Oct. 20, 2021

(65) Prior Publication Data

US 2023/0119562 A1    Apr. 20, 2023

(51) Int. Cl.
*B60W 30/18* (2012.01)
*B60W 40/06* (2012.01)
*B60W 40/11* (2012.01)
*B60W 40/112* (2012.01)

(52) U.S. Cl.
CPC ...... *B60W 30/18036* (2013.01); *B60W 40/06* (2013.01); *B60W 40/11* (2013.01); *B60W 40/112* (2013.01); *B60W 2520/22* (2013.01); *B60W 2552/35* (2020.02); *B60W 2720/10* (2013.01); *B60W 2720/106* (2013.01); *B60W 2720/22* (2013.01)

(58) Field of Classification Search
None
See application file for complete search history.

(56) References Cited

U.S. PATENT DOCUMENTS

| 10,890,925 B2 * | 1/2021 | Leonard | G05D 1/0016 |
| 2010/0013188 A1 * | 1/2010 | Ortmann | B60D 1/36 280/477 |

(Continued)

FOREIGN PATENT DOCUMENTS

| DE | 102019103742 A1 * | 8/2020 | B01B 21/22 |
| EP | 3889906 A1 | 10/2021 | |
| WO | WO-2019202317 A1 * | 10/2019 | G06T 7/73 |

OTHER PUBLICATIONS

International Search Report dated Feb. 17, 2023 of International Application PCT/US2022/078398 claiming priority to this application.

(Continued)

*Primary Examiner* — Amelia Vorce (57) ABSTRACT

A method and system for operating a vehicle's trailer reverse assist system is disclosed, including receiving vehicle sensor system data from one or more sensors supported by the vehicle. Based upon the received vehicle sensor data, a trailer pitch angle and a trailer roll angle of a coupled trailer are estimated relative to the vehicle. Surface unevenness of a surface traversed by the vehicle and the trailer is estimated, based upon the estimated trailer pitch angle and the estimated trailer roll angle. One or more parameters of the trailer reverse assist system or of the tow vehicle are adjusted based upon the estimated road surface variance. The trailer reverse assist system of the tow vehicle is subsequently operated using the adjusted one or more parameters.

22 Claims, 5 Drawing Sheets

(56) References Cited

U.S. PATENT DOCUMENTS

| | | | |
|---|---|---|---|
| 2016/0049020 A1* | 2/2016 | Kuehnle | G07C 5/0808 |
| | | | 701/34.4 |
| 2016/0257341 A1* | 9/2016 | Lavoie | B60W 30/18036 |
| 2021/0027490 A1 | 1/2021 | Matteo et al. | |
| 2022/0196395 A1* | 6/2022 | Maehnert | G01B 11/26 |
| 2022/0212732 A1* | 7/2022 | Peters | B60D 1/015 |

OTHER PUBLICATIONS

Fuchs Christian A et al, Camera-Based Assistance for Commercial Vehicles, published May 18, 2020—pp. 1-213—retrieved from the Internet: https://kola.opus.hbz-nrw.de/frontdoor/deliver/index/docId/2050/file/Dissertation_Christian_Fuchs.pdf—Translation.

* cited by examiner

```
┌─────────────────────────────────────────────┐
│ Receiving, At Data Processing Hardware,     │
│ Vehicle Sensor Data From One Or More        │
│ Sensors Supported By The Vehicle            │
│                                         302 │
└─────────────────────────────────────────────┘
                      │
                      ▼
┌─────────────────────────────────────────────┐
│ Determine Pitch, Roll Angle For Trailer     │
│                                         304 │
└─────────────────────────────────────────────┘
                      │
                      ▼
┌─────────────────────────────────────────────┐
│ Estimate Amount Of Surface Unevenness       │
│                                         306 │
└─────────────────────────────────────────────┘
                      │
                      ▼
       309 ╲    ╱ Surface      ╲    NO
            ╲  ╱  Unevenness >  ╲───────────┐
             ╲╱   Threshold?    ╱            │
              ╲               ╱              │
               ╲             ╱               │
                  │ YES                      │
                  ▼                          │
┌─────────────────────────────────────────────┐│
│ Adjust Trailer Reverse Assist Parameter(s) ││
│ Based On Amount Of Surface Unevenness      ││
│                                         308││
└─────────────────────────────────────────────┘│
                  │                          │
                  ▼                          │
┌─────────────────────────────────────────────┐
│ Operate The Trailer Reverse Assist System   │
│ Using The Current Parameters                │
│                                         310 │
└─────────────────────────────────────────────┘
```

SYSTEM AND METHOD FOR ADJUSTING TRAILER REVERSE ASSIST PARAMETERS BASED UPON ESTIMATED TRAILER POSITION

TECHNICAL FIELD

This disclosure relates to operating a tow vehicle coupled to a trailer, and particularly to a system and method for adjusting trailer reverse assist functionality.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack. Other attachment mechanisms may also be used. Existing trailer reverse assist systems associated with tow vehicles provide driving assistance when the tow vehicle and trailer are maneuvered in the reverse direction.

When traveling over an uneven road surface or an off-road surface, bumps and holes along the surface result in the tow vehicle and the trailer assuming new positions relative to each other. With sufficient positioning of the tow vehicle relative to the trailer, some existing trailer reverse assist systems are deactivated due to a detected trailer jackknife event. Deactivation of the trailer reverse assist system causes customer dissatisfaction.

SUMMARY

The disclosure provides a method of operating a trailer reverse assist system of a tow vehicle coupled to a trailer. The method includes receiving, at data processing hardware of the trailer reverse assist system, vehicle sensor system data from one or more sensors supported by the tow vehicle. The data processing hardware estimates, based upon the received vehicle sensor data, a trailer pitch angle and a trailer roll angle, relative to the tow vehicle. The data processing hardware also estimates surface unevenness of a surface traversed or being traversed by the tow vehicle and the trailer, based upon the estimated trailer pitch angle and the estimated trailer roll angle. One or more parameters of the trailer reverse assist system or of the tow vehicle are estimated by the data processing hardware based upon the estimated surface unevenness. The trailer reverse assist system is then operated using the adjusted one or more parameters.

The method may further include determining, at the data processing hardware, trailer pitch angle variance based upon the estimated trailer pitch angle, and determining trailer roll angle variance based upon the estimated trailer roll angle, wherein estimating the surface unevenness is based upon the trailer pitch angle variance and the trailer roll angle variance. The data processing hardware may determine a derivative of the trailer pitch angle variance and a derivative of the trailer roll angle variance, wherein estimating the surface unevenness is based upon the derivative of the trailer pitch angle variance and the derivative of the trailer roll angle variance.

The adjusted one or more parameters may include a maximum yaw angle between the tow vehicle and the trailer during a reverse maneuver of the tow vehicle and the trailer.

The adjusted one or more parameters may include at least one of a maximum speed or a maximum acceleration of the tow vehicle during a reverse maneuver of the tow vehicle and the trailer.

The adjusted one or more parameters may include a dynamic response of the trailer reverse assist system or of the tow vehicle. In one implementation, the dynamic response of the trailer reverse assist system includes at least one of a degree of sensitivity of a steering system of the tow vehicle or a degree of an acceleration system of the tow vehicle during execution of a reverse maneuver.

Estimating the surface unevenness is further based upon at least one of a speed of the tow vehicle, acceleration of the tow vehicle or a wheel pulse counter value of the tow vehicle. Estimating the trailer pitch angle and estimating the trailer roll angle are performed when the tow vehicle is operating at least one of a reverse maneuver or a forward maneuver. Estimating the surface unevenness includes estimating surface variance of the surface traversed or being traversed by the tow vehicle and the trailer.

The disclosure also provides a trailer reverse assist system of a tow vehicle coupled to a trailer, the trailer reverse assist system including data processing hardware and non-transitory memory hardware in communication with the data processing hardware, the non-transitory memory hardware storing program code instructions that when executed on the data processing hardware cause the data processing hardware to perform the method described above.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A tow vehicle, such as, but not limited to a car, a crossover, a truck, a van, a sports-utility-vehicle (SUV), and a recreational vehicle (RV) may be configured to tow a trailer. The tow vehicle connects to the trailer by way of a trailer hitch.

Figure 1A:
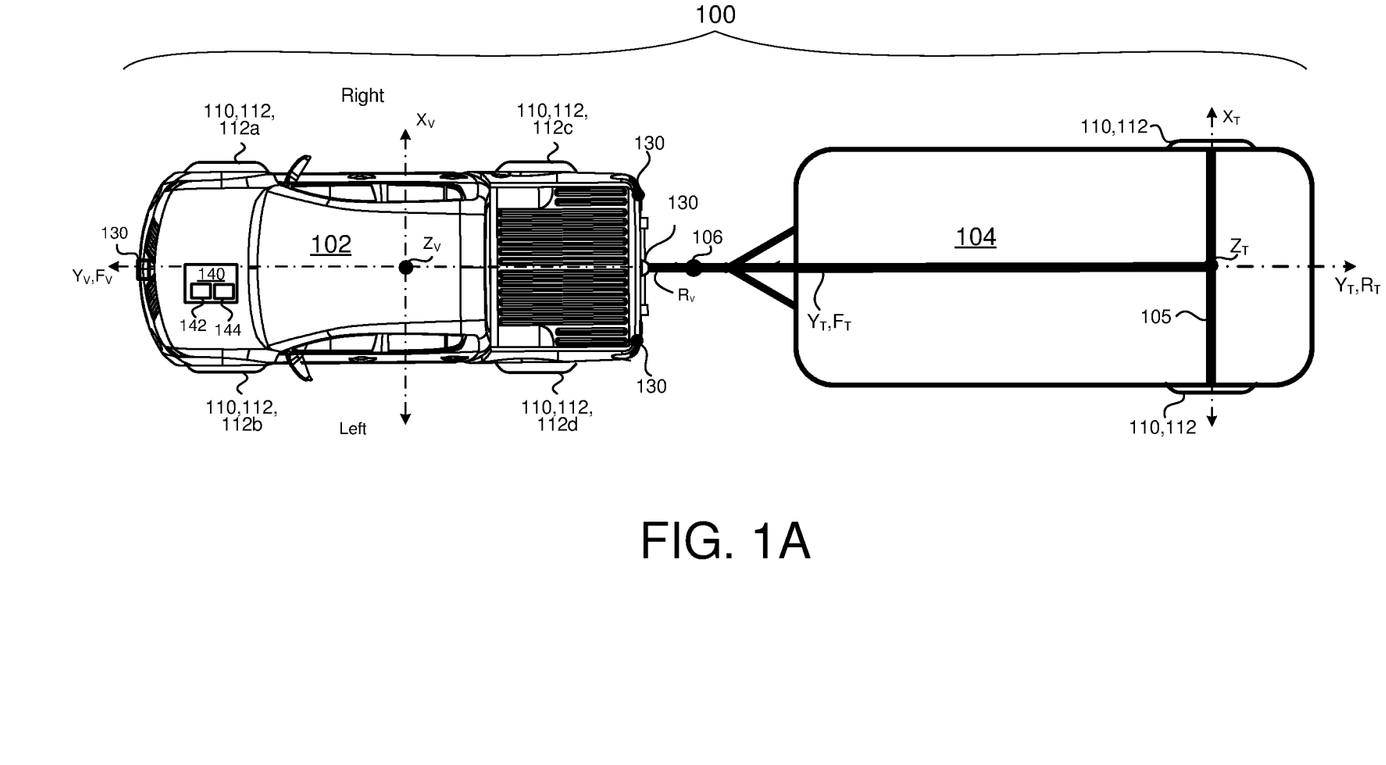
FIG. 1A is a top view of an exemplary tow vehicle hitched to a trailer.
Figure 1B:
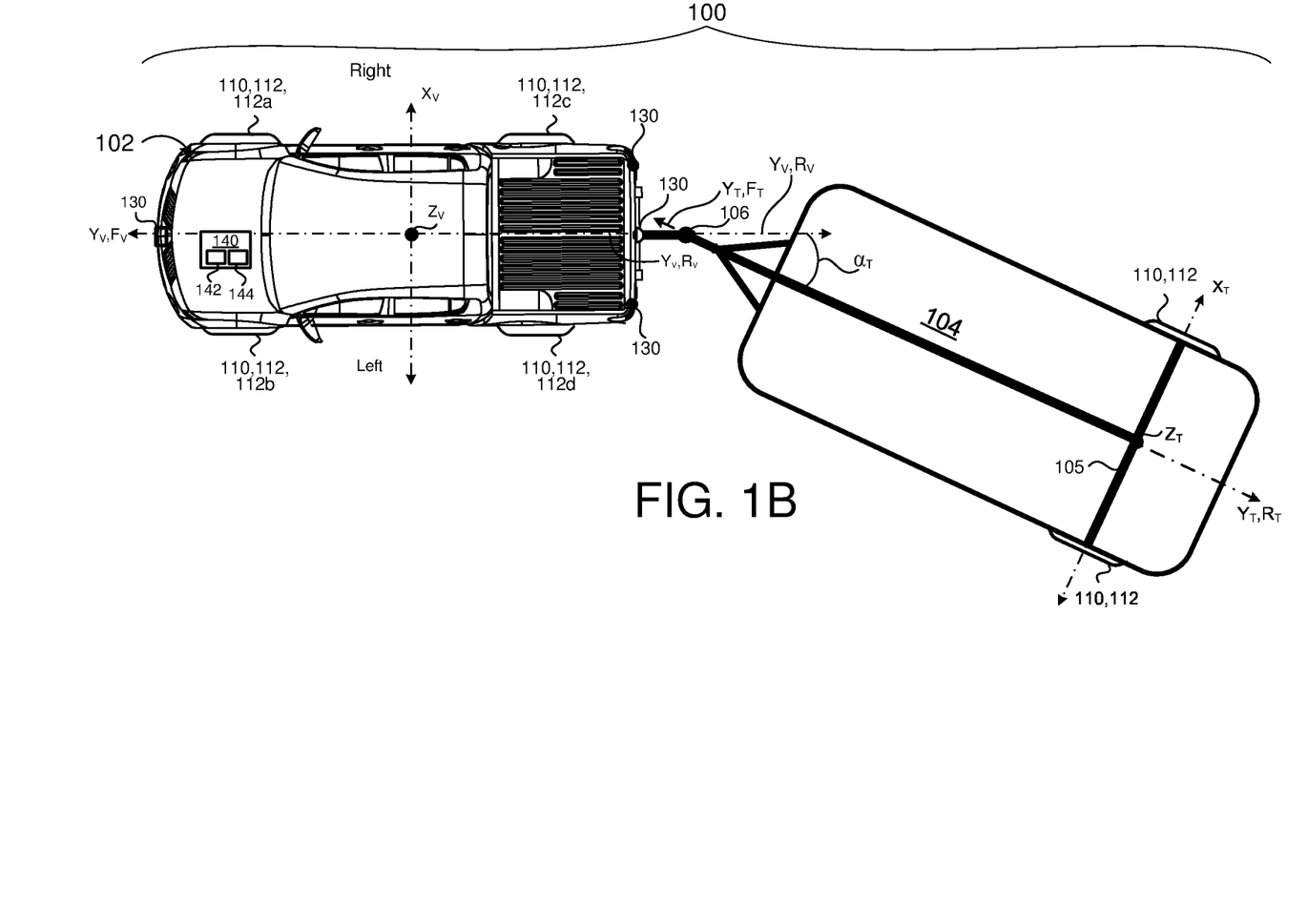
FIG. 1B is a top view of the exemplary tow vehicle and the trailer shown in FIG. 1A, where the trailer is at an angle with respect to the tow vehicle.
Figure 2:
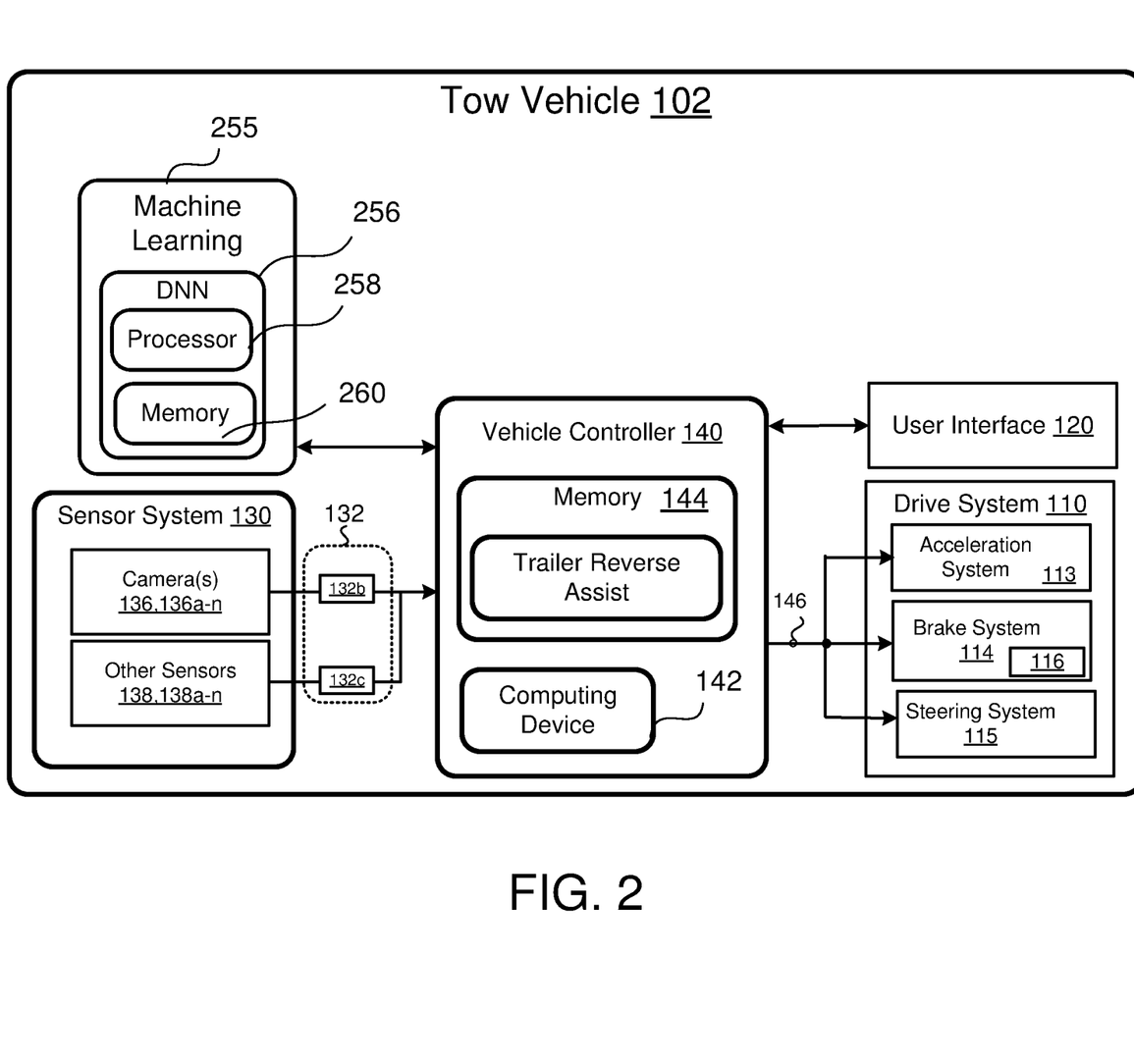
FIG. 2 is a schematic view of the tow vehicle of FIGS. 1A and 1B including a trailer reverse assist system according to an example embodiment.

Referring to FIGS. 1A-2, in some implementations, a vehicle-trailer system 100 includes a tow vehicle 102 hitched to a trailer 104 by way of a hitch 106. The tow vehicle 102 includes a drive system 110 associated with the tow vehicle 102 that maneuvers the tow vehicle 102 and thus the vehicle-trailer system 100 across a road or other surface based on drive maneuvers or commands having x, y, and z components, for example. As shown, the drive system 110 includes a front right wheel 112, 112a, a front left wheel 112, 112b, a rear right wheel 112, 112c, and a rear left wheel 112, 112d. In addition, the drive system 110 may include wheels (not shown) associated with the trailer 104. The drive system 110 may include other wheel configurations as well. The drive system 110 includes other components (not shown) that are in communication with and connected to the wheels 112 that allow the tow vehicle 102 to move, thus moving the trailer 104 as well. The drive system 110 may also include a brake system 114 that includes brakes 116 associated with each wheel 112, 112a-d, where each brake 116 is associated with a wheel 112a-d and is configured to slow down or stop the wheel 112a-n from rotating. In some examples, the brake system 114 is connected to one or more brakes 116 supported by the trailer 104. The drive system 110 may also include an acceleration system 113 that is configured to adjust a speed of the tow vehicle 102 and thus the vehicle-trailer system 100, and a steering system 115 that is configured to adjust a direction of the tow vehicle 102 and thus the vehicle-trailer system 100. The vehicle-trailer system 100 may include other systems as well.

The tow vehicle 102 may move across the road surface by various combinations of movements relative to three mutually perpendicular axes defined by the tow vehicle 102: a transverse axis $X_V$, a fore-aft axis $Y_V$, and a central vertical axis $Z_V$. The transverse axis $X_V$ extends between a right side R and a left side of the tow vehicle 102. A forward drive direction along the fore-aft axis $Y_V$ is designated as $F_V$, also referred to as a forward motion. In addition, an aft or rearward drive direction along the fore-aft direction $Y_V$ is designated as $R_V$, also referred to as rearward motion. In some examples, the tow vehicle 102 includes a suspension system (not shown), which when adjusted causes the tow vehicle 102 to tilt about the $X_V$ axis and or the $Y_V$ axis, or move along the central vertical axis $Z_V$. As the tow vehicle 102 moves, the trailer 104 follows along a path of the tow vehicle 102. Therefore, when the tow vehicle 102 makes a turn as it moves in the forward direction $F_V$, then the trailer 104 follows along.

Moreover, the trailer 104 follows the tow vehicle 102 across the road surface by various combinations of movements relative to three mutually perpendicular axes defined by the trailer 104: a trailer transverse (pitch) axis $X_T$, a trailer fore-aft (roll) axis $Y_T$, and a trailer central vertical (yaw) axis $Z_T$. The trailer transverse axis $X_T$ extends between a right side R and a left side of the trailer 104, for example, along the trailer axle 105. A forward drive direction along the trailer fore-aft axis $Y_T$ is designated as $F_T$, also referred to as a forward motion. In addition, a trailer aft or rearward drive direction along the fore-aft direction $Y_T$ is designated as $R_T$, also referred to as rearward motion. Therefore, movement of the vehicle-trailer system 100 includes movement of the tow vehicle 102 along its transverse axis $X_V$, fore-aft axis $Y_V$, and central vertical axis $Z_V$, and movement of the trailer 104 along its trailer transverse axis $X_T$, trailer fore-aft axis $Y_T$, and trailer central vertical axis $Z_T$. Therefore, when the tow vehicle 102 makes a turn as it moves in the forward direction $F_V$, then the trailer 104 follows along. While turning, the tow vehicle 102 and the trailer 104 form a trailer angle $\alpha_T$ being an angle between the vehicle fore-aft axis $Y_V$ and the trailer fore-aft axis $Y_T$.

The tow vehicle 102 may include a user interface 120, such as a display. The user interface 120 is configured to display information to the driver. In some examples, the user interface 120 is configured to receive one or more user commands from the driver via one or more input mechanisms and/or displays one or more notifications to the driver. In some examples, the one or more input mechanisms of the user interface 120 is a touch screen display. In other examples, the one or more input mechanisms of the user interface 120 is not a touchscreen and the driver may use an input device, such as, but not limited to, a rotary knob or a mouse to make a selection or otherwise provide information.

In some implementations, the tow vehicle 102 includes a sensor system 130 to provide sensor system data 132 that may be used to determine one or more measurements associated with an environment of the tow vehicle 102, the trailer 104, and/or objects surrounding the tow vehicle 102. In some examples, the tow vehicle 102 may be autonomous or semi-autonomous, therefore, the sensor system 130 provides for reliable and robust autonomous driving. The sensor system 130 may include different types of sensors that may be used separately or with one another to create a perception of the tow vehicle's environment or a portion thereof that is used by the vehicle-trailer system 100 to determine measurements and/or identify object(s) in its environment and/or in some examples autonomously drive and make intelligent decisions based on objects and obstacles detected by the sensor system 130. In some examples, the sensor system 130 is supported by the rear portion of the tow vehicle 102 and provides sensor system data 132 associated with object(s) and the trailer 104 positioned behind the tow vehicle 102. The tow vehicle 102 may support the sensor system 130 while in other examples, the sensor system 130 is supported by both the tow vehicle 102 and the trailer 104. The sensor system 130 may include sensor(s) 136, 138 positioned on the rear vehicle bumper 108 and/or on the front bumper (not shown). In some examples, the sensor system 130 may also include sensor(s) 136, 138 positioned on a rear portion of the trailer 104.

In some implementations, the sensor system 130 includes one or more imaging devices 136, 136a-n, such as cameras. The one or more cameras 136, 136a-n capture images of an environment of the tow vehicle 102.

In some implementations, the sensor system 130 includes other sensors 138, 138a-n such as, but not limited to, radar, sonar, LIDAR (Light Detection and Ranging, which can entail optical remote sensing that measures properties of scattered light to find range and/or other information of a distant target), LADAR (Laser Detection and Ranging), ultrasonic sensors, etc. The other sensors 138, 138a-n may be positioned on a rear portion of the tow vehicle 102.

The sensor system 130 provides sensor system data 132 that includes camera image(s) 132b captured by the camera (s) 136, and sensor data 132c captured by the other sensors 138. Therefore, the sensor system 130 is especially useful for receiving information of the environment or portion of the environment of the vehicle 102 and for increasing safety in the vehicle-trailer system 100 which may operate by the driver, or under semi-autonomous or autonomous conditions.

The drive system 110, the user interface 120, and the sensor system 130 are in communication with a vehicle controller 140 that includes a computing device (or data processing hardware) 142 (e.g., central processing unit having one or more computing processors) in communication with non-transitory memory or hardware memory 144 (e.g., a hard disk, flash memory, random-access memory) capable of storing program code instructions executable on the computing processor(s)). In some example, the non-transitory memory 144 stores program code instructions that when executed on the computing device 142 cause the vehicle controller 140 to provide signals or commands 146 which control the tow vehicle 102 in a reverse maneuver, either autonomously or semi-autonomously, as described herein. Such instructions form at least part of a trailer reverse assist system along with the vehicle controller 140, the drive system 110 (including the acceleration system 113, the brake system 114 and the steering system 115) and the sensor system 130. As shown, the vehicle controller 140 is supported by the tow vehicle 102; however, the vehicle controller 140 may be separate from the tow vehicle 102 and in communication with the tow vehicle 102 via a network (not shown).

As mentioned, operating a reverse maneuver when travelling over particularly uneven road surfaces is seen to result in the trailer reverse assist system to undesirably lose control and become deactivated. Example embodiments are generally directed to modifying the operation of the trailer reverse assist system and/or the tow vehicle 102 based upon an amount of road surface unevenness detected. In one implementation, one or more parameters utilized by the trailer reverse assist system is adjusted or otherwise updated based upon a determined unevenness of the road surface travelled by the tow vehicle 102 and the trailer 104.

Specifically, the trailer reverse assist system monitors the pitch angle and the roll angle of the trailer 104 relative to the tow vehicle 102 and estimates the amount of road surface unevenness based upon changes in the monitored axes. One or more parameters utilized by the trailer reverse assist system are adjusted and/or updated based upon the estimated road surface unevenness.

Reference is made herein of the surface over which the tow vehicle 102 and the trailer 104 travel as a "road surface." It is understood that the trailer reverse assist system and the example embodiments described here may be used when the tow vehicle 102 and the trailer 104 travel over any road or off-road surface, such as a parking area, campsite location, etc.

In one implementation, the trailer reverse assist system uses rearward facing sensors or cameras 136, 138 of the sensor system 130 to capture images of the trailer 104 while the tow vehicle 102 is moving in the forward or reverse direction. The system estimates or otherwise determines the pitch angle and the roll angle of the trailer 104 based upon the captured images. The pitch angle refers to the angle of the pitch axis $X_T$ of the trailer 104 relative to the transverse axis Xv of the tow vehicle 102, and the roll angle refers to the angle of the trailer fore-aft axis $Y_T$ of the trailer 104 relative the fore-aft axis Yv of the tow vehicle 102. Changes to the estimated pitch angle and the estimated roll angle of the trailer 104 are evaluated by the trailer reverse assist system, and an amount of road surface unevenness is estimated based upon the estimated pitch angle and the estimated roll angle. In an implementation, the variance of each of the pitch angle and the roll angle of the trailer 104 is determined, and the amount of road surface unevenness is estimated based upon the determined pitch angle and roll angle variances. In another implementation, a first derivative of the variance of the pitch angle of the trailer 104 and a first derivative of the variance of the roll angle of the trailer 104 are determined, and the amount of road surface unevenness is estimated based upon the determined first derivative of the pitch angle variance and the determined first derivative of the roll angle variance of the trailer 104. In an implementation, the trailer reverse assist system calculates the variance of the amount of road surface unevenness, determines whether or not to adjust or update one or more parameters of the trailer reverse assist system, and determines the amount of such adjustment based upon the calculated variance of the amount of road surface unevenness.

Figure 3:
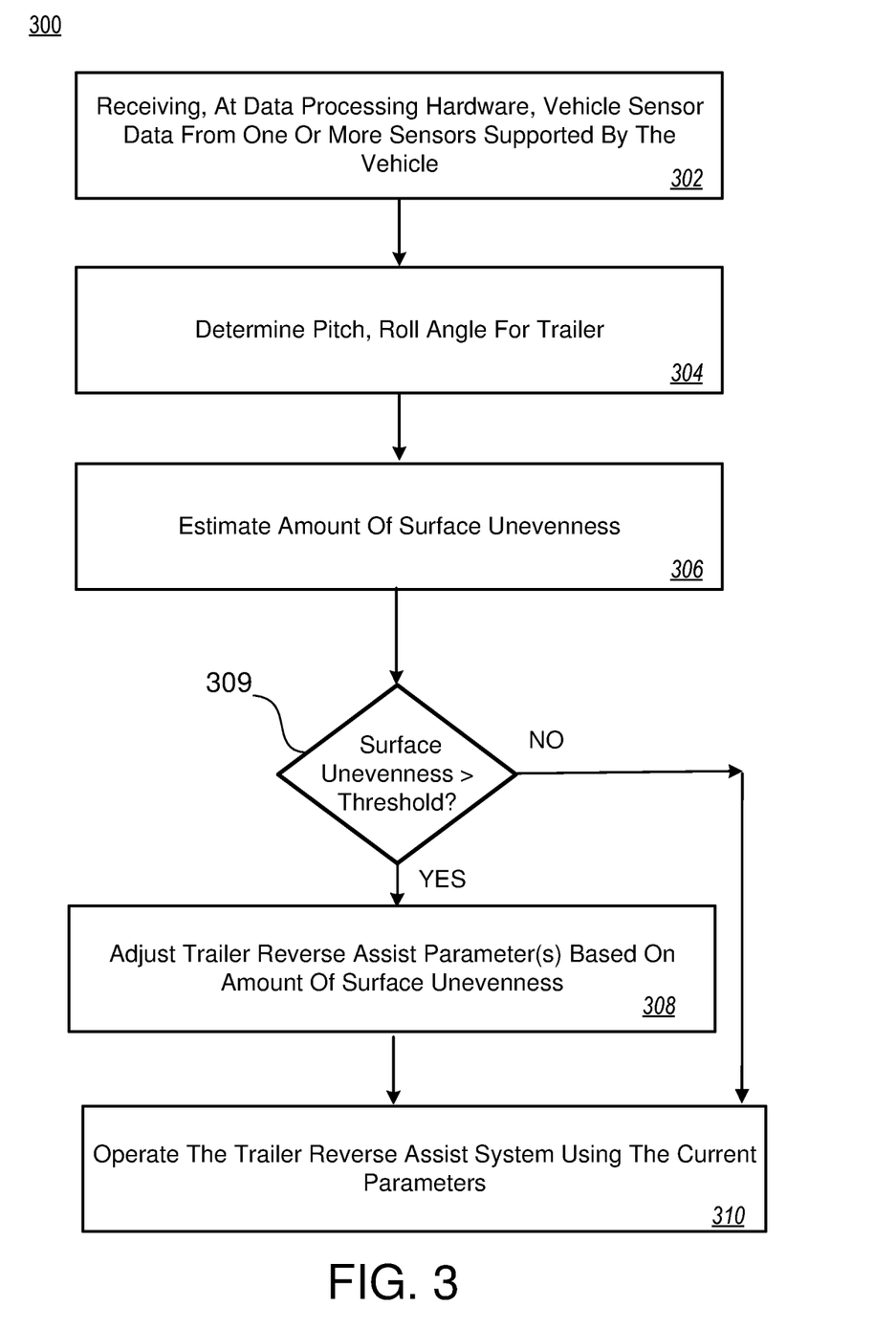
FIG. 3 is a flowchart illustrating an operation of trailer reverse assist system according to an example embodiment.

FIG. 3 illustrates a flowchart of an operation 300 of the trailer reverse assist system according to an example embodiment. This operation 300 may be performed each time a new image is captured of the trailer 104 by the sensor system 130 of the tow vehicle 102. Initially, vehicle controller 140, and particularly the computing device 142 thereof, receives at 302 vehicle sensor data 132b, 132c from sensor system 130. The sensor data may be an image of the trailer 104 captured from a rearward facing sensor 136, 138.

At 304, the vehicle controller 140, and particular the computing device 142 thereof, determines the pitch angle and the roll angle of the trailer 104 relative to the tow vehicle 102. In one implementation, this involves identifying the representation of the trailer 104 in the captured image and determining the position of the trailer representation in the image. From the determined position of the trailer representation, the vehicle controller 140 determines the pitch angle and the roll angle of the trailer 104 relative to the tow vehicle 102. Identifying the trailer representation in the captured image and/or determining the position of the trailer presentation in the captured image may be performed by the vehicle controller 140 and/or by a machine learning system having a neural network located within vehicle controller 140 or separate therefrom. FIG. 2 shows tow vehicle 102 including a machine learning system 255, according to an example embodiment. The machine learning system 255 includes a machine learning algorithm having a trained model that is built on training data. The trained model is able to make predictions or decisions without explicit programming code to do so. In one implementation illustrated in FIG. 2, the machine learning system 255 is one or more neural networks 256, for example, a deep neural network. The neural network 256 pertains to computational approaches used in computer science, among other disciplines, and is based on a large collection of neural unites, loosely imitating the way a biological brain solves problems with large clusters of biological neurons connected by axons. The neural network 256 is self-learning and trained, rather than programed, and excels in areas where the solution feature detection is difficult to express in a traditional computer program. In other words, the neural network 256 is a set of algorithms that is designed to recognize patterns. The recognized patterns are numerical, vectors, into which all-real-world data, such as images, text, sound, or time series is translated. The neural network 256 includes multiple layers of nonlinear processing units 258 in communication with non-transitory memory 260. The non-transitory memory 260 stores instructions that when executed on the nonlinear processing units 258 cause the neural network 256 to provide an output. Each nonlinear processing unit 258 is configured to transform an input or signal using parameters that are learned through training. A series of transformations from input to outputs occurs at the multiple layers of the nonlinear processing units 258. The particular use of the neural network 256 will be described in greater detail below. Even though the machine learning system 255 shown in FIG. 2 as implemented by the neural network 256, it is understood that the machine learning system 255 may have other machine learning algorithm-based implementations. In the illustrated embodiment, the neural network 256 identifies the representation of the trailer 104 in the captured image and/or determines the pitch angle and the roll angle of the trailer 104 based upon the identified trailer representation.

In another example embodiment, the tow vehicle 102 does not include the neural network 256 and the representation of the trailer 104 in the captured image is identified, and the pitch angle and roll angle of the trailer 104 are determined by data processing algorithms stored as program code instructions in the memory 144.

Figure 4:
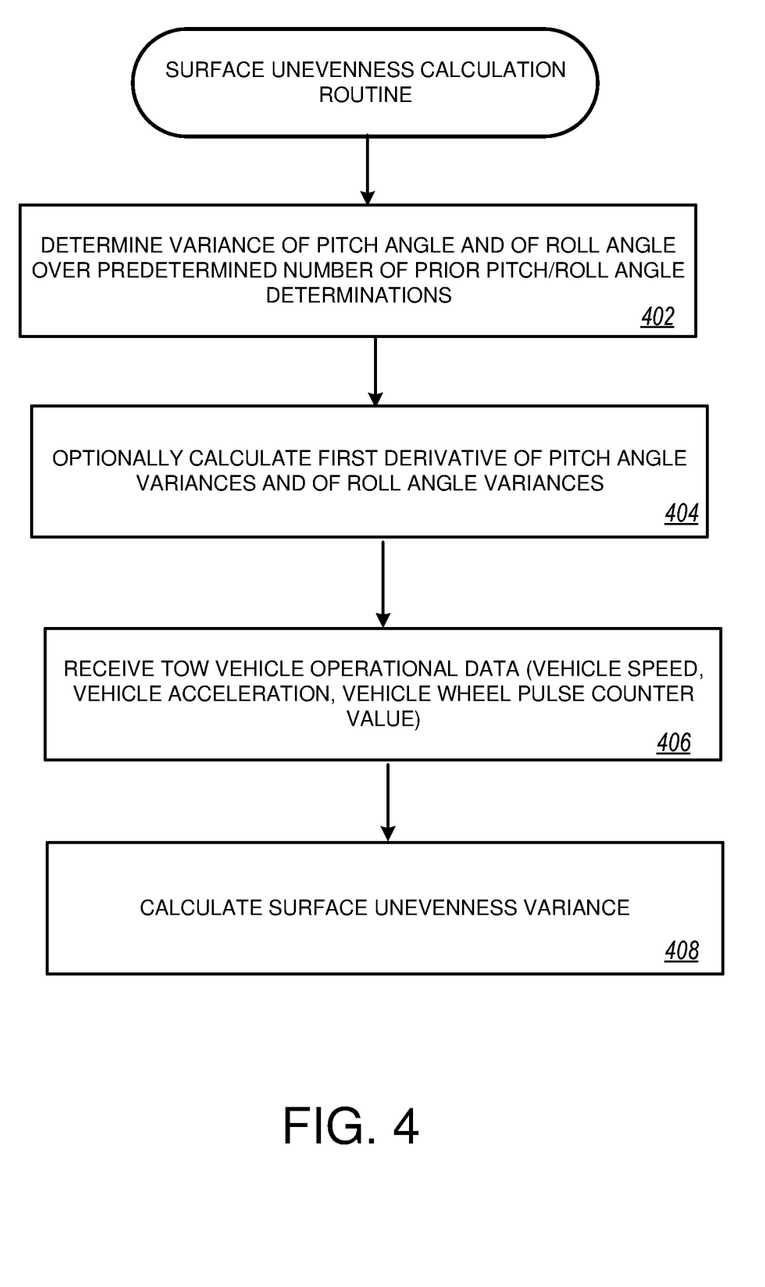
FIG. 4 is a flowchart illustrating a portion of the operation of the trailer reverse assist system of FIG. 3.

Next, the vehicle controller 140 estimates at 306 the surface unevenness in the road or other surface on which the trailer 104 is disposed based upon the determined pitch angle and the determined roll angle of the trailer 104. FIG. 4 illustrates the acts performed in estimating the surface unevenness at 306. At 402, the vehicle controller 140 determines the variance of the pitch angle and the variance of the roll angle over a predetermined number of pitch angle and roll angle determinations. The vehicle controller 140 may optionally calculate at 404 the first derivative of the pitch angle variance and the first derivative of the roll angle variance. At 406, operational data of the tow vehicle 102 is collected or received by the vehicle controller 140. This operational data may include, for example, the speed of the tow vehicle 102, the value(s) of the vehicle wheel pulse counter(s) associated with the wheel(s) 112 of the tow vehicle 102, and the acceleration of the tow vehicle 102. The vehicle controller 140 determines at 408 the unevenness of the surface over which the trailer 104 traversed or is traversing based upon the collected operational data of the tow vehicle 102, the determined variances of the pitch angle and of the roll angle, and optionally the calculated first derivatives of the pitch angle variances and the first derivative of the roll angle variances. In one implementation, the vehicle controller 140 determines the variance of the surface unevenness over a predetermined number of recent surface unevenness determinations.

Referring again to FIG. 3, the vehicle controller 140 determines at 309 whether the calculated surface unevenness and/or the variance thereof is sufficient to adjust one or more parameters associated with the trailer reverse assist system. In one implementation, this is performed by comparing the determined surface unevenness and/or the variance thereof with a predetermined threshold. Upon a determination that the surface unevenness and/or the variance thereof does not exceed the predetermined threshold, the trailer reverse assist system continues operating at 310 without any parameter adjustment.

However, upon a determination that the determined surface unevenness and/or the variance thereof exceeds the predetermined threshold, the vehicle controller 140 adjusts at 308 one or more parameters based upon the determined surface unevenness and/or the variance thereof. This parameter adjustment of the trailer reverse assist system serves to prevent system deactivation due to the identification of a jackknife condition, for example, and in doing so enhances driver satisfaction. In one implementation, the one or more parameters adjusted includes the maximum trailer (yaw) angle during a reverse maneuver, the maximum speed of the tow vehicle 102 during the reverse maneuver, and/or the amount of tow vehicle acceleration during the reverse maneuver. The one or more parameters may be applied to the tow vehicle 102 while operated autonomously or semi-autonomously. At 310, the trailer reverse assist system is subsequently operated using the adjusted parameter(s).

In addition, the one or more parameters may be parameters of the dynamic response of the trailer reverse assist system and/or tow vehicle 102 during a reverse maneuver, including the responsiveness of the steering system 115 and/or the responsiveness of the acceleration system 113 of the tow vehicle 102. For example, if the yaw angle is reduced as a result of a determined surface unevenness variance, the responsiveness and/or sensitivity of the steering system 113 may be reduced accordingly. This responsiveness of the steering system 113 results in the trailer angle change rate being adjusted and in this case, reduced. If, for example, the maximum speed or acceleration of the tow vehicle 102 is reduced as a result of a determined surface unevenness variance, the responsiveness and/or sensitivity of the acceleration system 113 may be reduced accordingly. This responsiveness of the acceleration system 113 results in the trailer in the trailer speed change rate being adjusted. By adjusting one or more parameters associated with the trailer reverse assist system in this way, the trailer reverse assist system of the tow vehicle 102 better accounts for surface variance when performing a reverse maneuver.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing hardware apparatus. The computer readable medium can be a machine-readable storage device, a machine-readable storage substrate, a memory device, a composition of matter effecting a machine-readable propagated signal, or a combination of one or more of them. The terms "data processing apparatus", "data processing hardware," "computing device" and "computing processor" encompass all apparatus, devices, and machines for processing data, including by way of example a programmable processor, at least one processor core, a controller or microcontroller, a computer, or multiple processors or computers. The system or apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method for operating a trailer reverse assist system of a tow vehicle coupled to a trailer, the trailer reverse assist system including data processing hardware, the method comprising:
   receiving, at the data processing hardware, vehicle sensor system data from one or more sensors supported by the vehicle;
   estimating, based upon the received vehicle sensor data, a trailer pitch angle and a trailer roll angle, relative to the tow vehicle;
   estimating, at the data processing hardware, surface unevenness of a surface traversed by the tow vehicle and the trailer, based upon the estimated trailer pitch angle and the estimated trailer roll angle;
   adjusting, at the data processing hardware, one or more parameters of the trailer reverse assist system or of the tow vehicle based upon the estimated surface unevenness;
   operating, by the data processing hardware, the trailer reverse assist system of the tow vehicle using the adjusted one or more parameters; and,
   determining, at the data processing hardware, trailer pitch angle variance based upon the estimated trailer pitch angle, and determining, at the data processing hardware, trailer roll angle variance based upon the estimated trailer roll angle, wherein estimating the surface unevenness is based upon the trailer pitch angle variance and the trailer roll angle variance.

2. The method of claim 1, further comprising determining, at the data processing hardware, a derivative of the trailer pitch angle variance and a derivative of the trailer roll angle variance, wherein estimating the surface unevenness is based upon the derivative of the trailer pitch angle variance and the derivative of the trailer roll angle variance.

3. The method of claim 1, wherein the adjusted one or more parameters comprises a maximum yaw angle between the tow vehicle and the trailer during a reverse maneuver of the tow vehicle and the trailer.

4. The method of claim 1, wherein the adjusted one or more parameters comprises at least one of a maximum speed or a maximum acceleration of the tow vehicle during a reverse maneuver of the tow vehicle and the trailer.

5. The method of claim 1, wherein the adjusted one or more parameters comprises a dynamic response of the trailer reverse assist system or of the tow vehicle.

6. The method of claim 5, wherein the dynamic response of the trailer reverse assist system comprises at least one of a degree of sensitivity of a steering system of the tow vehicle or a degree of an acceleration system of the tow vehicle.

7. The method of claim 1, wherein estimating the surface unevenness is further based upon at least one of speed of the tow vehicle, acceleration of the tow vehicle or a wheel pulse counter value of the tow vehicle.

8. The method of claim 1, wherein estimating the trailer pitch angle and estimating the trailer roll angle are performed when the tow vehicle is operating at least one of a reverse maneuver or a forward maneuver.

9. The method of claim 1, wherein estimating the surface unevenness comprises estimating surface variance of the surface traversed by the tow vehicle and the trailer.

10. A trailer reverse assist system of a tow vehicle coupled to a trailer, the trailer reverse assist system comprising:
    data processing hardware; and
    non-transitory memory hardware in communication with the data processing hardware, the non-transitory memory hardware storing instructions that when executed on the data processing hardware cause the data processing hardware to perform operations comprising:
      receiving vehicle sensor system data from one or more sensors supported by the vehicle;
      estimating, based upon the received vehicle sensor data, a trailer pitch angle and a trailer roll angle, relative to the tow vehicle;
      estimating surface unevenness of a surface traversed by the trailer based upon the estimated trailer pitch angle and the estimated trailer roll angle;
      adjusting one or more parameters of the trailer reverse assist system or of the tow vehicle based upon the estimated surface unevenness;
      operating the trailer reverse assist system and the tow vehicle using the adjusted one or more parameters; and
      determining trailer pitch angle variance based upon the estimated trailer pitch angle, and determining, at the data processing hardware, trailer roll angle variance based upon the estimated trailer roll angle, wherein estimating the surface unevenness is based upon the trailer pitch angle variance and the trailer roll angle variance.

11. The trailer reverse assist system of claim 10, the instructions, when executed on the data processing hardware, causes the data processing hardware to further perform operations comprising determining a derivative of the trailer pitch angle variance and a derivative of the trailer roll angle variance, wherein estimating the surface unevenness is based upon the derivative of the trailer pitch angle variance and the derivative of the trailer roll angle variance.

12. The trailer reverse assist system of claim 10, wherein the adjusted one or more parameters comprises at least one of a maximum speed or a maximum acceleration of the tow vehicle during a reverse maneuver of the tow vehicle and the trailer.

13. The trailer reverse assist system of claim 10, wherein the adjusted one or more parameters comprises a dynamic response of the trailer reverse assist system or of the tow vehicle.

14. The trailer reverse assist system of claim 13, wherein the dynamic response of the trailer reverse assist system comprises at least one of a degree of sensitivity of a steering system or a degree of an acceleration system of the tow vehicle.

15. The trailer reverse assist system of claim 10, wherein estimating the surface unevenness is further based upon at least one of speed of the tow vehicle, acceleration of the tow vehicle or a wheel pulse counter value of the tow vehicle.

16. The trailer reverse assist system of claim 10, wherein estimating the trailer pitch angle and estimating the trailer roll angle are performed when the tow vehicle is operating at least one of a reverse maneuver or a forward maneuver.

17. The trailer reverse assist system of claim 10, wherein estimating the surface unevenness comprises estimating surface variance of the surface traversed by the tow vehicle and the trailer.

18. A computer software product for a trailer reverse assist system comprising computer program instructions, stored on non-transitory memory hardware and which, when executed by data processing hardware, causes the data processing hardware to perform operations comprising:
receiving vehicle sensor system data from one or more sensors supported by a tow vehicle;
estimating, based upon the received vehicle sensor data, a trailer pitch angle and a trailer roll angle of a trailer coupled to the tow vehicle, relative to the tow vehicle;
estimating surface unevenness of a surface traversed by the trailer based upon the estimated trailer pitch angle and the estimated trailer roll angle;
adjusting one or more parameters of the trailer reverse assist system or of the tow vehicle based upon the estimated surface unevenness;
operating the trailer reverse assist system and the tow vehicle using the adjusted one or more parameters; and
determining at least one of trailer pitch angle variance based upon the estimated trailer pitch angle, or trailer roll angle variance based upon the estimated trailer roll angle, wherein estimating the surface unevenness is based upon the at least one of trailer pitch angle variance or the trailer roll angle variance.

19. The computer software product of claim 18, wherein determining the at least one of trailer pitch angle variance or the trailer roll angle variance comprises determining the trailer pitch angle variance and the trailer roll angle variance, and wherein estimating the surface unevenness is based upon the trailer pitch angle variance and the trailer roll angle variance.

20. The computer software product of claim 18, further comprising determining, at the data processing hardware, a derivative of the at least one of the trailer pitch angle variance or the trailer pitch roll angle variance, wherein estimating the surface unevenness is based upon the derivative of the at least one of the trailer pitch angle variance or the derivative of the trailer roll angle variance.

21. The computer software product of claim 20, wherein determining the derivative of the at least one of the trailer pitch angle variance or the trailer pitch roll angle variance comprises determining the derivative of the trailer pitch angle variance and the trailer pitch roll angle variance, and wherein estimating the surface unevenness is based upon the derivative of the trailer pitch angle variance and the derivative of the trailer roll angle variance.

22. The computer software product of claim 18, wherein determining the at least one of trailer pitch angle variance or trailer roll angle variance comprises determining the trailer roll angle variance, and wherein estimating the surface unevenness is based upon the trailer roll angle variance.

* * * * *